United States Patent [19]

Endo et al.

[11] Patent Number: 5,798,684
[45] Date of Patent: Aug. 25, 1998

[54] THIN-FILM TEMPERATURE SENSOR

[75] Inventors: Haruyuki Endo; Takeshi Fuse; Hiroyuki Ishida, all of Tokyo, Japan

[73] Assignee: Ishizuka Electronics Corporation, Tokyo, Japan

[21] Appl. No.: 623,089

[22] Filed: Mar. 28, 1996

[30] Foreign Application Priority Data

Mar. 31, 1995 [JP] Japan ................ 7-076084

[51] Int. Cl.$^6$ ................ H01C 7/10
[52] U.S. Cl. ................ 338/22 R; 338/15; 338/18; 338/25; 29/612
[58] Field of Search ................ 338/13, 15, 18, 338/25, 22 R; 29/612; 250/338.1

[56] References Cited

U.S. PATENT DOCUMENTS

| | | | |
|---|---|---|---|
| 2,994,053 | 7/1961 | De Waard | 338/18 |
| 4,024,397 | 5/1977 | Wiener | 5/197 |
| 4,062,107 | 12/1977 | Blackman et al. | 29/612 |
| 4,139,833 | 2/1979 | Kirsch | 338/308 |
| 4,224,520 | 9/1980 | Greene et al. | 250/338.4 |
| 4,361,597 | 11/1982 | Arima et al. | 338/25 |
| 4,574,263 | 3/1986 | Liddiard | 338/18 |
| 4,575,493 | 3/1986 | Rauch, Sr. | 501/10 |
| 5,048,336 | 9/1991 | Sugihara et al. | |
| 5,118,944 | 6/1992 | Mori et al. | |
| 5,294,910 | 3/1994 | Tani et al. | 338/306 |
| 5,302,933 | 4/1994 | Kudo et al. | 338/18 |
| 5,404,125 | 4/1995 | Mori et al. | 338/18 |
| 5,426,412 | 6/1995 | Tomonari et al. | |

FOREIGN PATENT DOCUMENTS

| | | |
|---|---|---|
| 667532 | 7/1960 | Canada ................ 338/18 |
| 60-19641 | 5/1985 | Japan . |
| 62-277528 | 12/1987 | Japan . |
| 3-136379 | 6/1991 | Japan . |
| 6-241890 | 9/1994 | Japan . |
| 7-77267 | 8/1995 | Japan . |
| 7-95054 | 10/1995 | Japan . |

OTHER PUBLICATIONS

Engel, J.M. "High Thermal Conductance Substrate", IBM TDB vol. 4, No. 8, p. 59. Jan. 1962.

*Primary Examiner*—Teresa J. Walberg
*Assistant Examiner*—Karl Easthom
*Attorney, Agent, or Firm*—Lowe, Price, LeBlanc & Becker

[57] ABSTRACT

A thin-film temperature sensor with a robust bridge structure and a stable electric characteristic, as well as a method of manufacture thereof, is provided. Over the substrate 1 with the cavity 13 are formed electrode layers 6 in a bridge shape, whose electrodes 6A, 6B are bonded with thermal sensitive resistor films 7, 8, which are then covered with a protective insulating film 9, a buffer film 10 and a glass layer 11 in that order. The protective insulating film 9 and the glass layer 11 extend over the substrate 1 to increase the mechanical strength of the infrared sensitive element A. The sandwich structure of the insulating films 5, 9 holding the thermal sensitive resistor films 7, 8 in between and the use of the buffer film 10 combine to prevent electrical characteristic variations, which would otherwise be caused by changes in composition of the thermal sensitive resistor films 7, 8 during the heat treatment process. The glass layer 11 is formed of borosilicate glass to improve its infrared absorption characteristic.

12 Claims, 7 Drawing Sheets

THIN-FILM TEMPERATURE SENSOR

BACKGROUND OF THE INVENTION

1. Field of the Invention

The present invention relates to a thin-film temperature sensor and a method of manufacture thereof and more particularly to a thin-film temperature sensor which has an increased mechanical strength and an improved infrared absorption characteristic of the sensor portion and a method of manufacture thereof.

2. Description of the Prior Art

Generally, the thin-film temperature sensor is a thin-film type sensor which comprises an alumina or silicon substrate and multiple layers—such as electrode film, thermal sensitive resistor film, insulating film and protective film—laminated on the substrate by using the semiconductor micromachining technique. Known examples of a thermal type infrared sensor with such a structure include a micro-thermistor bolometer and a thin-film thermistor.

The thermal type infrared sensor is a non-contact type sensor that measures the surface temperature of hot objects and moving objects. This sensor measures the surface temperature of an object as follows. An infrared detecting portion of the sensor is heated by the energy of infrared radiated from the object being measured and a change in electric resistance of a thermal sensitive resistor making up the infrared detecting portion of the sensor is detected as a temperature change, from which the surface temperature is determined.

The detecting portion of the thermal type infrared sensor uses a thin film and a thin-film thermocouple, made of thermistor or metal resistor material whose resistance changes with temperature. Because the infrared red radiated from the object of interest is generally weak, the infrared sensitive element of the sensor has a small heat capacity to achieve the required high infrared absorption characteristic. Furthermore, since the device fabrication technique must have a high level of precision, the semiconductor micromachining technique is normally used.

An example of the thermal type infrared sensor is disclosed in Japan Patent Application Laid-Open No. 62-277528. As shown in FIG. 7A, this infrared sensor has a bridge structure, in which the infrared detecting portion forms a metal layer 22, over which an insulating thin film 23 and a infrared absorption layer 24 are deposited successively, with a substrate 20 on the back of these layers etched to form a cavity 21.

Japan Patent Application Laid-Open No. 3-136379 discloses a bridge-structured infrared sensor in which a sacrifice layer is formed and etched to form a heat sensing portion, with the insulating film supported only at its periphery (not shown).

The thermal type infrared sensor having a thin-film temperature sensor increases the heat resistance between the infrared detecting portion and the substrate by forming the infrared detecting portion (infrared sensitive element) into a bridge shape to make the heat capacity of the infrared detection portion very small. This makes it possible to realize an infrared sensor with a fast infrared detection response and a high sensitivity.

An example of thin-film thermistor is disclosed in Japan Patent Publication No. 60-19641. In the thin-film thermistor shown in FIG. 7B, comb-shaped pattern electrode films 25a, 25b made of platinum (Pt) or platinum alloy are formed over the insulating substrate by the semiconductor micromachining technique. Over these electrode films are deposited a thermal sensitive resistor film 26 of silicon carbide and a glass layer, with a silicon oxide thin film interposed between the resistor film and the glass layer.

This thin-film thermistor has an increased adhesion of the thermal sensitive resistor film 26 because of the glass layer. Because the glass layer can protect against contamination by ambient air, the reliability of the thermistor is improved. Further, because the infrared sensitive element is formed of a thin film, the heat capacity is small making the thermal response very good. The thin-film thermistor therefore makes a temperature sensor with good environmental resistance.

Furthermore, because the semiconductor fabrication technique can be used, the thin-film thermistor has the advantages of high mass-productivity and being able to be manufactured in small sizes.

The conventional thin-film temperature sensors, however, have the following problems. In the thermal type infrared sensor of FIG. 7A, the infrared detecting portion is required to support the infrared sensitive element, the electrode portion and the infrared absorption film by the insulating film and to maintain a sufficient strength to withstand stresses produced during the whole manufacture process including a substrate etch process for forming the bridge structure. This bridge structure, however, has a drawback that it is subjected to thermal stresses resulting from thermal expansion coefficient differences and is easily cracked, peeled off, or broken during manufacture.

In the thin-film thermistor of FIG. 7B, when the glass layer is heat-treated, a part of the composition of the glass layer is diffused into the thermal sensitive resistor film through the silicon oxide thin film, causing characteristic variations in the thermal sensitive resistor film such as resistance and other electric characteristic variations, deteriorating the product yield. Particularly when the thermal sensitive resistor film is made of a thermistor thin film of a composite oxide of transition metals, the composition making up the glass layer is diffused into the thermistor film, changing its composition and therefore the electric characteristic of the thermal sensitive resistor film. This in turn increases variations in electric characteristic of the thin-film thermistor, resulting in an increased number of faulty products and a reduced mass-productivity.

The present invention has been accomplished to overcome the above-mentioned drawbacks and to provide a thin-film temperature sensor having a robust bridge structure and an improved infrared absorption characteristic as well as the method of manufacture of such a thin-film temperature sensor.

SUMMARY OF THE INVENTION

To achieve the above objective, the thin-film temperature sensor according to the first aspect of this invention comprises: a substrate; a pair of electrode layers formed on the substrate; first and second insulating films; at least one layer of thermal sensitive resistor film in contact with the pair of electrode layers and disposed between the first and second insulating films; a buffer film formed over the surface of the second insulating film deposited directly over the thermal sensitive resistor film; and a glass layer covering the buffer film.

According to the second aspect of this invention, the thin-film temperature sensor comprises: a substrate formed with a cavity; a first insulating film formed over the substrate in the form of a bridge; a pair of metal base layers formed opposite each other over the first insulating film; a second insulating film formed over the first insulating film between the pair of metal base layers; a pair of electrode layers deposited over the metal base layers and extending over the second insulating film; at least one thermal sensitive resistor film formed over and in contact with the pair of electrode layers; a protective insulating film provided over the thermal sensitive resistor film; a buffer film formed over the protective insulating film; and a glass layer extending over the substrate and covering the buffer film.

According to the third aspect of this invention, the thin-film temperature sensor comprises: a substrate made of ceramics; a first insulating film formed over the substrate; a pair of metal base layers formed opposite each other over the first insulating film; a second insulating film formed over the first insulating film between the pair of metal base layers; a pair of electrode layers deposited over the metal base layers and extending over the second insulating film; at least one thermal sensitive resistor film formed over and in contact with the pair of electrode layers; a protective insulating film provided over the thermal sensitive resistor film; a shock absorbing film formed over the protective insulating film; and a glass layer extending over the substrate and covering the buffer film.

According to the fourth aspect of this invention, the first insulating film formed over the substrate is a thin film of aluminum oxide or tantalum oxide.

According to the fifth aspect of this invention, the thermal sensitive resistor film is a thermistor and is a thin film made of a transition metal oxide.

According to the sixth aspect of this invention, the buffer film is a tantalum oxide or a titanium oxide.

According to the seventh aspect of this invention, the glass layer is made of a borosilicate glass-based oxide.

According to the eighth aspect of this invention, the method of making a thin-film temperature sensor comprises the steps of: forming a first insulating film over one of the surfaces of the substrate; forming a pair of metal base layers over one of the surfaces of the substrate; forming a second insulating film between the metal base layers; forming a pair of opposing electrode layers over the pair of metal base layers so that the electrode layers extend over the second insulating film; forming at least one thermal sensitive resistor film in contact with the pair of electrode layers; forming a protective insulating film over the thermal sensitive resistor film; forming a buffer film over the protective insulating film; and forming a glass layer to cover the buffer film.

The thin-film temperature sensor of this invention as a construction in which the thermal sensitive resistor film is held between the insulating film and the protective insulating film. This sandwich structure is intended to prevent the composition of the glass layer and substrate from being diffused into the thermal sensitive resistor film by thermal stresses produced during the eat treatment process and also to prevent the components f the thermal sensitive resistor film from diffusing into the insulating film. Variations in the electric characteristic of the thermal sensitive resistor film can therefore be prevented. Further, the buffer film provided between the glass layer and the protective insulating film for the thermal sensitive resistor film prevents the composition of the glass layer from diffusing into the thermal sensitive resistor film through the protective insulting film during the heat treatment of the glass layer, hereby eliminating variations in the electric characteristic of the thermal sensitive resistor film.

Because the borosilicate glass forming the glass layer expands the infrared absorption wavelength band, he infrared absorption characteristic of the thin-film temperature sensor can be improved. When the thin-film temperature sensor is formed in the bridge structure as n the thermal type infrared sensor, the strength of the ridge portion can be increased, making the handling during manufacture easy and enhancing the mass-productivity.

The insulating film of aluminum oxide or tantalum oxide formed over the substrate can alleviate the thermal tresses applied to the substrate and at the same time improve adhesion with the metal base layer over this insulating film.

Because the infrared sensitive element is isolated from the substrate and formed in a bridge structure, the heat capacity of the infrared sensitive element can be made small and the heat resistance large, thus providing an excellent infrared thermal response characteristic.

DETAILED DESCRIPTION OF PREFERRED EMBODIMENT

Embodiments of the thin-film temperature sensor according to this invention are described in the following by referring to the accompanying drawings.

Figure 1A:
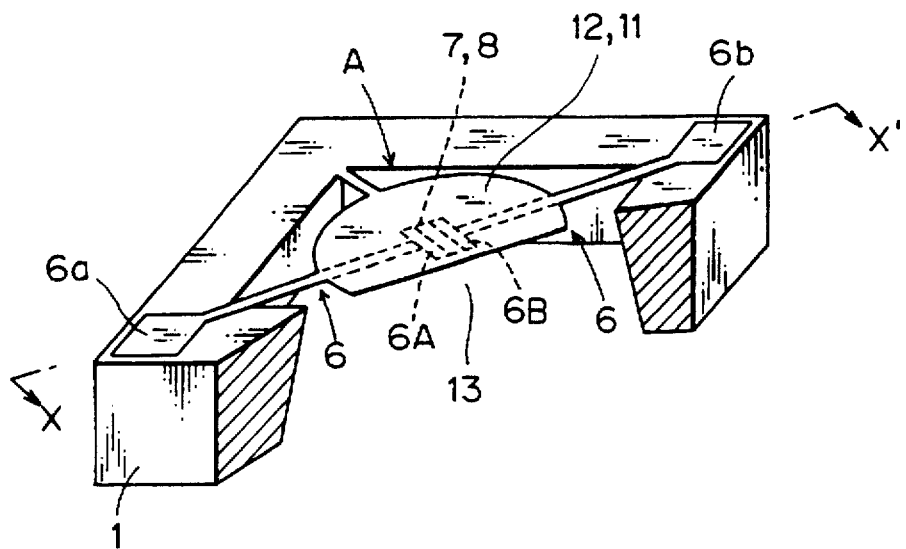
FIG. 1A is a partly cutaway perspective view of the thin-film temperature sensor as one embodiment of this invention.

FIG. 1A is a perspective view, partly cut away, of one embodiment of the thin-film temperature sensor used as a thermal type infrared sensor. Reference symbol A represents a infrared sensitive element, which has a bridge structure bridging a cavity 13 formed in a substrate 1. Denoted 6a, 6b are pads to which leads are attached. Conductive layers extending from the pads 6a, 6b have electrodes 6A, 6B formed at their front ends. These conductive layers form a pair of electrode layers 6. Designated 7, 8 are thermal sensitive resistor films; 11 a glass layer; and 12 an insulating film.

Figure 1B:
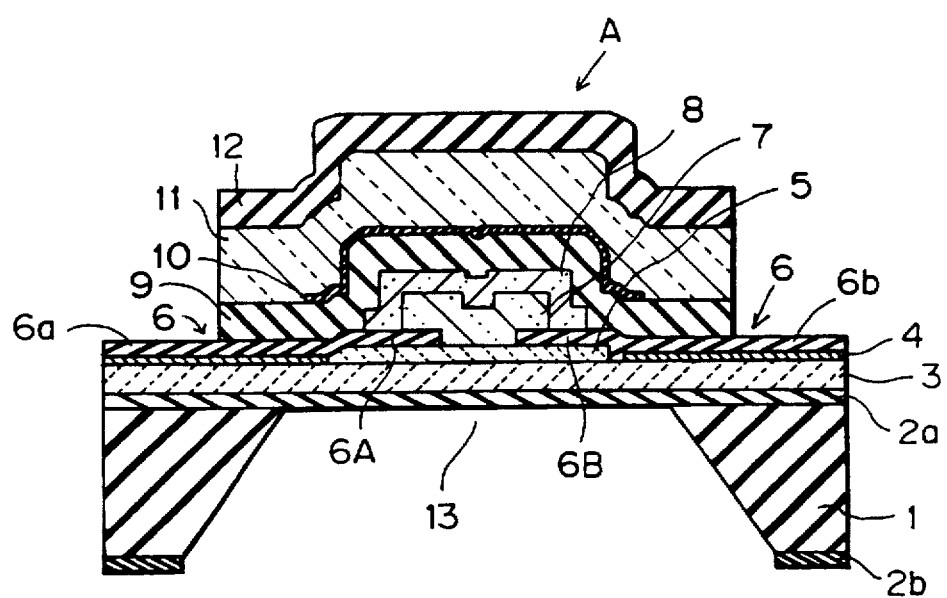
FIG. 1B is a cross section taken along the line X–X' of FIG. 1A.

For more detail, let us turn to FIG. 1B. Over the surface of the substrate 1 is formed a thermal-oxidized film (insulating film) 2a, over which an insulating film 3 is formed. On the surface of the insulating film 3 there are a pair of opposing metal base layers 4. Between the pair of metal base layers 4 there is formed an insulating film 5 which is in contact with the electrodes 6A, 6B. On the insulating film 5 is formed a thermal sensitive resistor film 7, over which another thermal sensitive resistor film 8 is laminated. The thermal sensitive resistor films 7, 8 are covered with a protective insulating film 9, which is further covered with a buffer film 10 for further protection of the thermal sensitive resistor films 7, 8. The buffer film 10 is further covered with a glass layer 11 and then an insulating film 12. The protective insulating film 9, the glass layer 11 and the insulating film 12 extend over the substrate 1.

The thin-film temperature sensor has the infrared sensitive element A structured in the form of a bridge, in which the cavity 13 is formed in the substrate 1 to increase the heat resistance to prevent the heat absorbed by the infrared sensitive element A from being dissipated to the substrate 1. The heat capacity of the infrared sensitive element A is made very small to improve the thermal response characteristic.

The insulating film 3 is a film of, say, aluminum oxide or tantalum oxide, which prevents peeling by chemical etchat of the metal base layers 4 when forming the insulating film 5, so that a solid joint with the metal base layers 4 is established. The buffer film 10 is a thin film of, say, tantalum oxide or titanium oxide, which serves as a diffusion prevention layer to prevent the composition of the glass layer 11 from diffusing into the thermal sensitive resistor films 7, 8 when forming the glass layer 11. The insulating film 5 prevents the composition of the thermal sensitive resistor films 7, 8 from diffusing.

The glass layer 11, as explained below, enhances the absorption of infrared.

Next, one embodiment of the process of making the thin-film temperature sensor is explained by referring to FIG. 2 to 4.

Figure 2A:
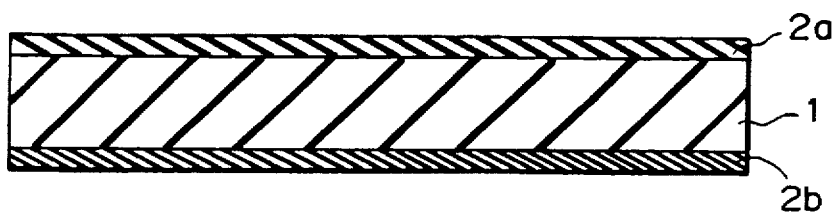
FIGS. 2A to 2D are cross sections showing the method of making the thin-film temperature sensor according to one embodiment of this invention.

The substrate 1 is a silicon substrate about 250 μm thick with a crystallographic orientation of (110) or (100). The substrate 1, as shown in FIG. 2A, is thermally oxidized at 900°–1100° C. to form thermal oxide films 2a, 2b of silicon dioxide to a thickness of about 0.1–1 μm on the front and back surfaces of the substrate 1.

Figure 2B:
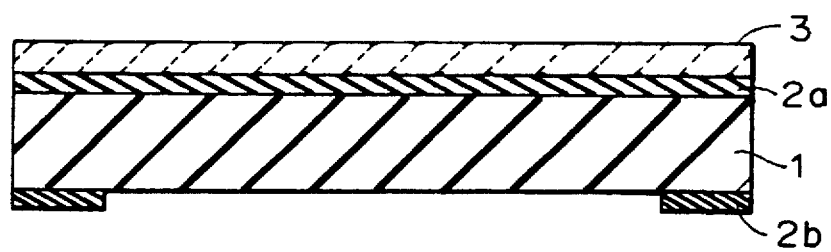

Then, as shown in FIG. 2B, the thermal oxide film 2b is patterned into an etch mask, which is used in a later process to form the cavity 13. The substrate 1 is further deposited with an insulating film 3 of aluminum oxide or tantalum oxide to a thickness of 0.1–3 μm by sputtering or chemical vapor deposition.

The insulating film 3 of aluminum oxide or tantalum oxide has a greater thermal expansion coefficient than that of the thermal oxide film 2b of silicon oxide and therefore alleviates the thermal stresses applied to the substrate when forming a film. The insulating film 3 also prevents the metal base layers 4 and electrode layers 6 from being peeled by chemical etchant during etching in the later process in which the insulating film 5 is formed.

Figure 2C:
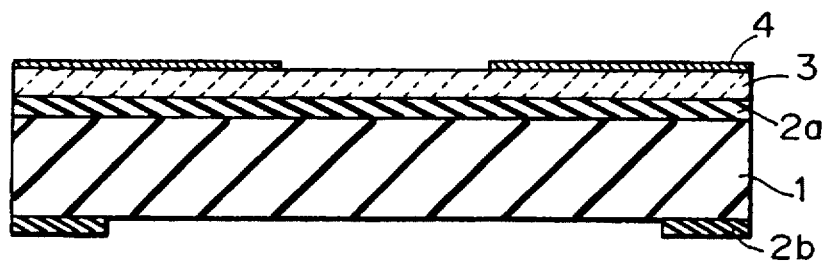

Next, as shown in FIG. 2C, a metal layer is sputtered over the entire surface of the insulating film 3 and then patterned by a photo-lithography to form a pair of metal base layers 4. The metal base layers 4 are a thin-film layer made of at least one of tantalum, titanium, chromium and molybdenum and are about 0.01–0.3 μm thick. This pair of metal base layers 4 are formed to improve the adhesion between the insulating film 3 and the portions formed in a later process that corresponds to the pads.

Figure 2D:
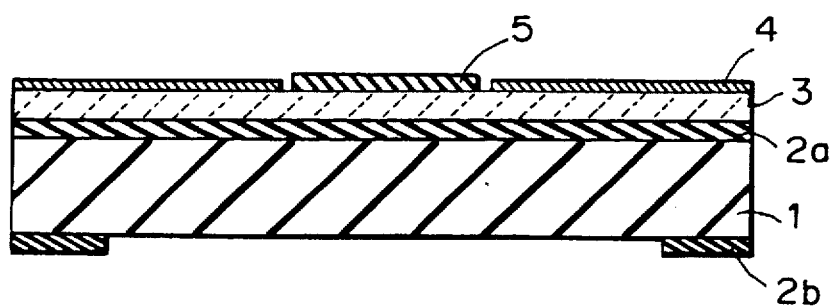

As shown in FIG. 2D, an insulating film such as silicon dioxide or silicon oxinitride (SiNO) is deposited over the entire surface to a thickness of 0.1–1 μm by sputtering or plasma CVD. Then, the insulating film is patterned to form an insulating film 5 between the pair of metal base layers 4.

This insulating film 5 improves adhesion to the substrate 1 of the electrode layers 6 and thermal sensitive resistor film 7, both formed in the later process, and prevents the resistance of the thermal sensitive resistor film 7 from being changed by its reaction with the insulating film 3, thereby maintaining stability of the electric performance of the thermal sensitive resistor films 7, 8.

Figure 3A:
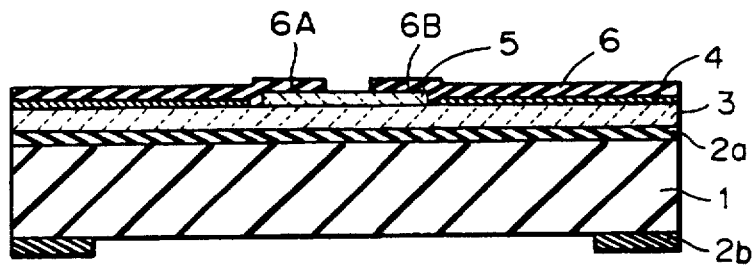
FIGS. 3A to 3D are cross sections showing the process of making the thin-film temperature sensor following the step of FIG. 2D.

Next, as shown in FIG. 3A, a metal layer is deposited over the entire surface by sputtering and is patterned to form conductive layers 6 which consist of pads 6a, 6b—to which leads are connected—and electrodes 6A, 6B at the ends of the conductive layers extending from the pads. The electrode layers 6, made up of the pads 6a, 6b and the electrodes 6A, 6B, are formed opposite each other over the metal base layers 4 to a thickness of 0.1–0.5 μm. The material of these electrode layers 6 is most preferably platinum but may also be nickel and chromium.

Figure 3B:
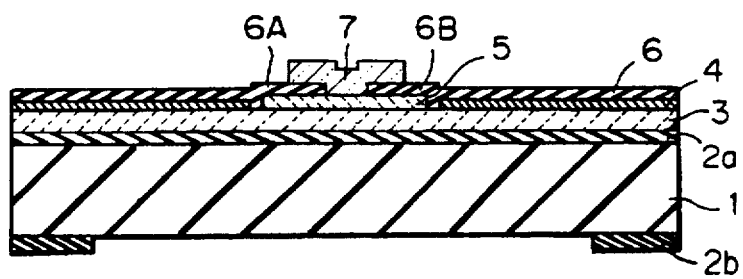
Figure 3C:
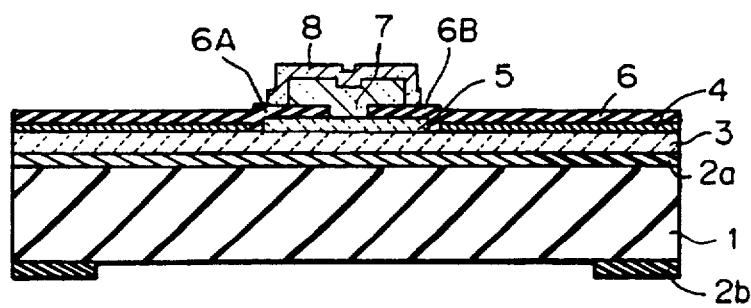

As shown in FIG. 3B and 3C, the insulating film 5 and the electrodes 6A, 6B are sputtered with first and second thermal sensitive resistor films 7, 8 each 0.1–0.5 μm thick.

The first and second thermal sensitive resistor films 7, 8 are deposited by sputtering, with a sintered Mn—Co—Ni transition metal oxide used as a target. For example, the sputtering is performed under the pressure of 0.1–0.7 Pa at the temperature of 200°–500° C.

The first thermal sensitive resistor film 7 is patterned first, followed by the patterning of the second thermal sensitive resistor film 8. Then, the device is heat-treated in air at 400°–900° C. for 1–5 hours. The thermal sensitive resistor films 7, 8 are not limited to the thin film of the above composition and may use a thin film of other compositions used for a thermistor or a silicon carbide thin film. It may also be an amorphous silicon thin film formed by plasma CVD.

The electric characteristic of the thermal sensitive resistor films 7, 8 used in this embodiment can be changed by changing the composition of their targets or the thickness of the films. If this objective can be achieved by the first thermal sensitive resistor film 7, the second thermal sensitive resistor film 8 is not necessary.

Figure 3D:
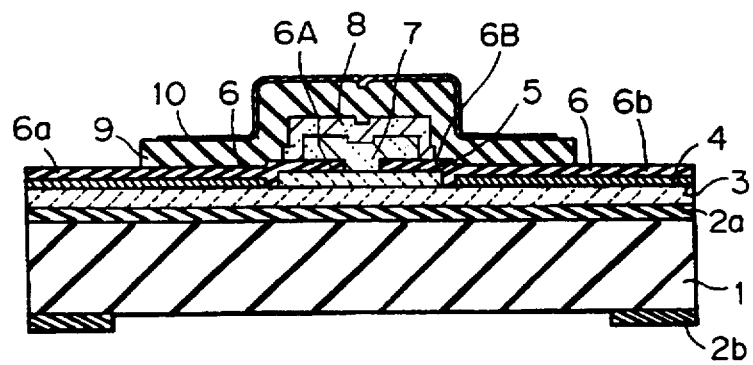

Next, as shown in FIG. 3D, to protect the second thermal sensitive resistor film 8, a passivation film or protective insulating film 9 of silicon oxide, silicon nitride or silicon oxinitride is formed over the second thermal sensitive resistor film 8 to the thickness of 0.5–3 μm. The protective insulating film 9 is covered with a buffer film 10 of tantalum oxide or titanium oxide. This buffer film 10 need only be about 0.01–1 μm thick and is intended to prevent the electrical characteristic of the thermal sensitive resistor films 7, 8 from being changed, as might otherwise occur when a part of the composition of the glass layer is diffused into the thermal sensitive resistor films 7, 8 by the thermal stresses produced when forming or heat-treating the glass layer 11 of borosilicate glass oxide.

Figure 4A:
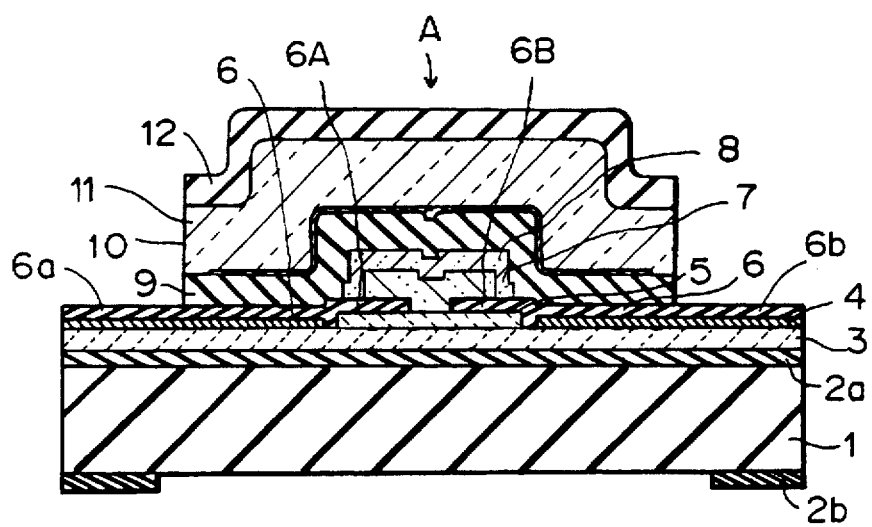
FIGS. 4A and 4B are cross sections showing the process of making the thin-film temperature sensor following the step of FIG. 3D.

After the buffer film 10 is formed and heat-treated, the glass layer 11 is deposited by sputtering or CVD as shown in FIG. 4A. That is, the glass layer 11 of this embodiment is formed by sputtering an oxide target of borosilicate lead glass ($PbO$—$B_2O_3$—$SiO_2$).

Next, the glass layer 11 thus formed is heat-treated at 300°–800° C. to be reflowed for smooth surface, improving the step-coverage over stepped portions of the underlying film. This reflowing process also reduces pin holes, making this glass layer 11 a good infrared absorption film.

Figure 4B:
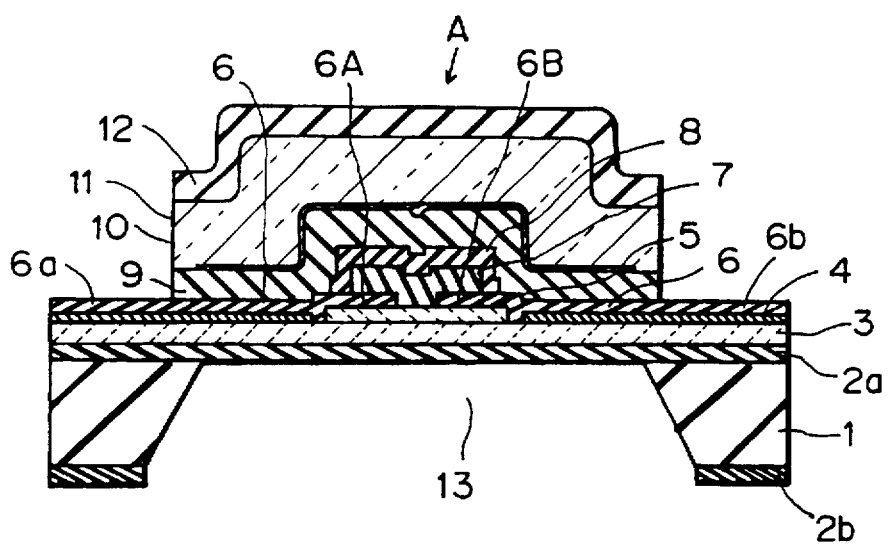

As shown in FIG. 4B, to form the cavity 13 in the substrate 1, an insulating film 12 of silicon oxide, silicon nitride or silicon oxinitride is formed to a thickness of 0.1–2 μm as a protective film to protect the infrared sensitive element A against a chemical etchant. Then, etching is performed to form the cavity 13 in the back of the substrate 1.

The process of forming the cavity 13, the final step in the process of device manufacturing, uses, for example, hydrazine hydrate as the etching solution for anisotropic etching. With the thermal oxide film 2b as an etch mask, the substrate on the back of the infrared sensitive element is etched away at 110° C. for about two hours to form the cavity 13. The infrared sensitive element A has a bridge structure.

Figure 5A:
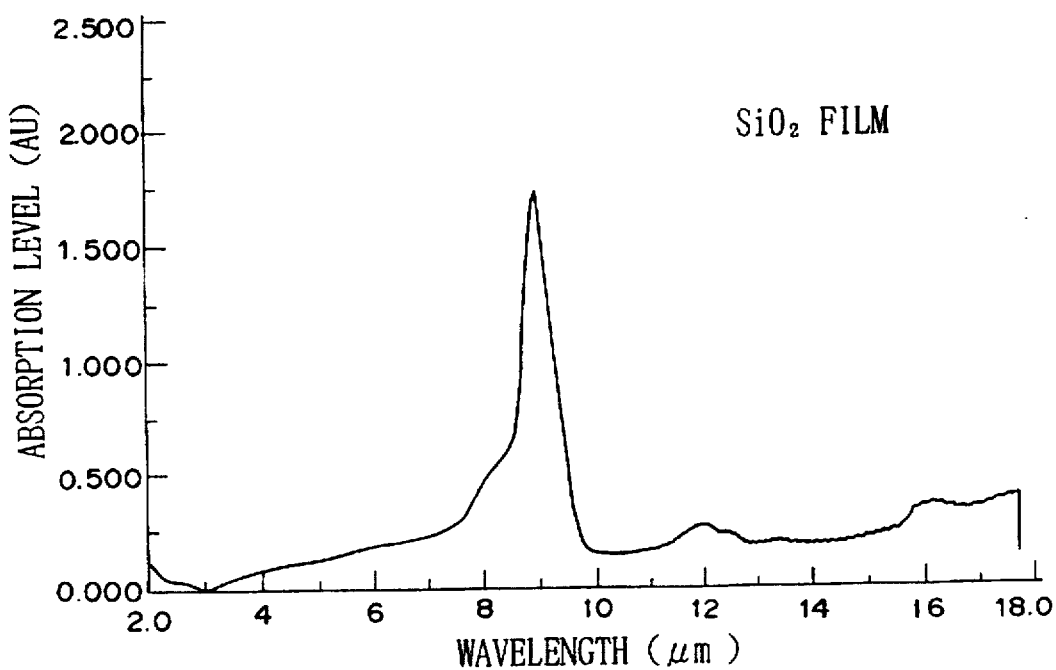
FIGS. 5A and 5B are characteristic diagrams of the thin-film temperature sensors for comparison.
Figure 5B:
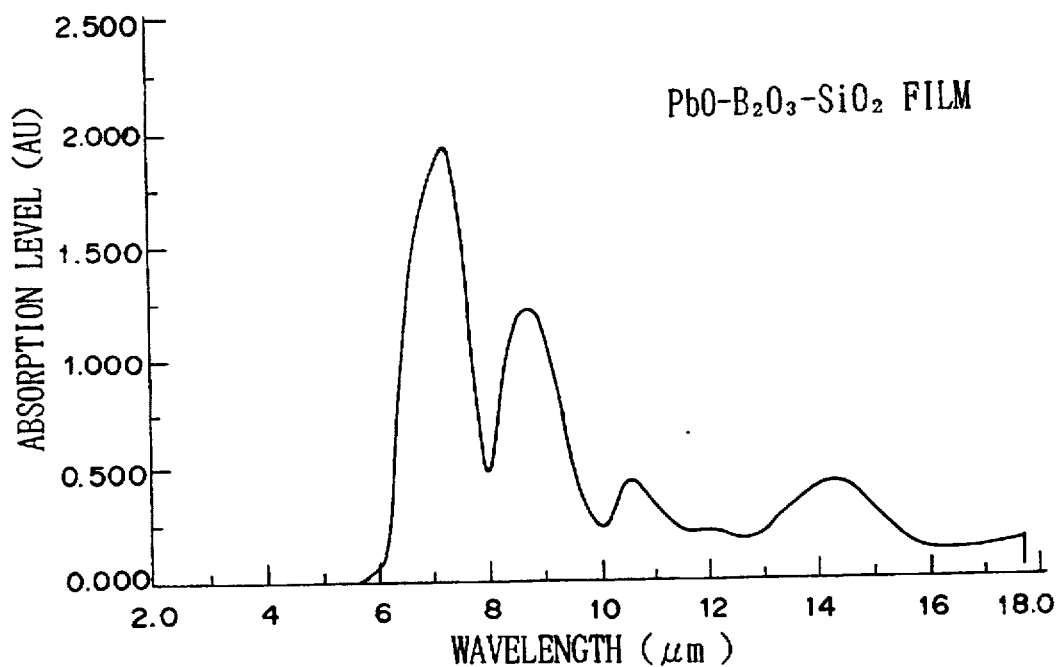

Next, the infrared absorption spectrum of the thin-film temperature sensor of this embodiment is described by referring to FIG. 5A and 5B. FIG. 5A represents an infrared absorption spectrum of the silicon oxide (or dioxide) film and FIG. 5B represents an infrared absorption spectrum of the glass layer 11 of borosilicate lead glass deposited by sputtering.

As can be seen from FIG. 5B, the glass layer 11 of borosilicate lead glass has an absorption band in the wavelength of about 6–11 µm (which corresponds to about −10° to 210° C.). FIG. 5A indicates that the silicon oxide (or dioxide) film has an absorption band in the wavelength of about 8–9.5 µm (which corresponds to about 30°–90° C.). That is, as in the thin-film temperature sensor of the embodiment, the use of glass layer 11 of borosilicate lead glass allows detection of a wider temperature range than the conventional silicon oxide (or dioxide) film.

The glass layer 11 is not limited to the glass layer 11 of borosilicate lead glass and may use borosilicate glass-based materials, which use other compositions than lead, to obtain electric and mechanical performances equivalent to those of the borosilicate lead glass of this embodiment. The materials can of course include a borosilicate glass with no additional components.

Although the foregoing description concerns the thin-film temperature sensors in the form of individually divided chips, the actual manufacture process fabricates many thin-film temperature sensors on a single substrate (wafer) at one time and then divides it into individual thin-film temperature sensors.

The electrode film may be formed in a comb shape in addition to the shape of this embodiment.

The thin-film temperature sensors fabricated as described above have no defects in external view, such as peeling or cracks, and the coefficient of variation $3\sigma/\bar{x}$ ($\sigma$: standad deviation) of their resistances in one substrate resides within 2%, which represents a very good yield.

Further, the temperature cycle test was carried out 10,000 times at 40° C. and 200° C. each and the rate of change of resistance before and after the tests was found to be +0.5%, which represents a very high level of reliability.

The thin-film temperature sensor of this embodiment is normally sealed in the package to form an infrared detector.

The thin-film temperature sensor is joined and mounted on a base made of insulator or metal, with the pads 6a, 6b connected to the terminals on the base through bonding wires.

While this embodiment concerns an infrared sensor made from a thin-film temperature sensor, it should be noted that the present invention is not limited to this embodiment but can be applied as a thin-film thermistor device.

Figure 6:
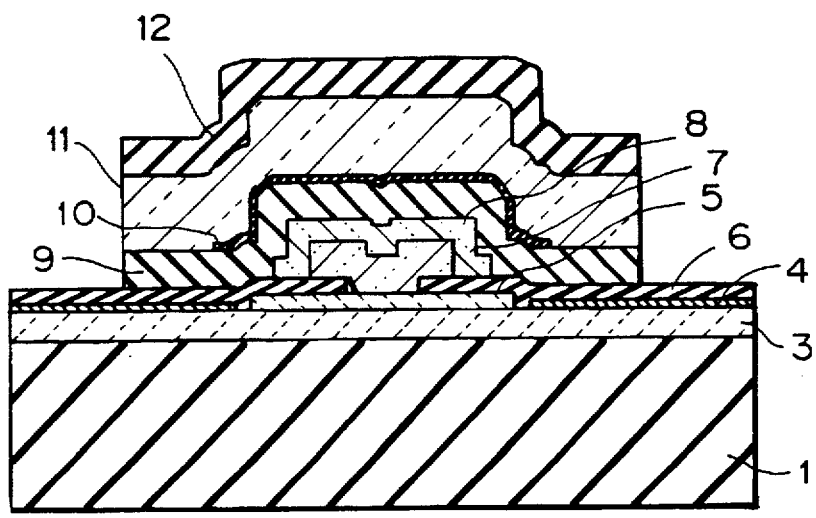
FIG. 6 is a cross section showing another embodiment of the thin-film temperature sensor according to this invention.
Figure 7A:
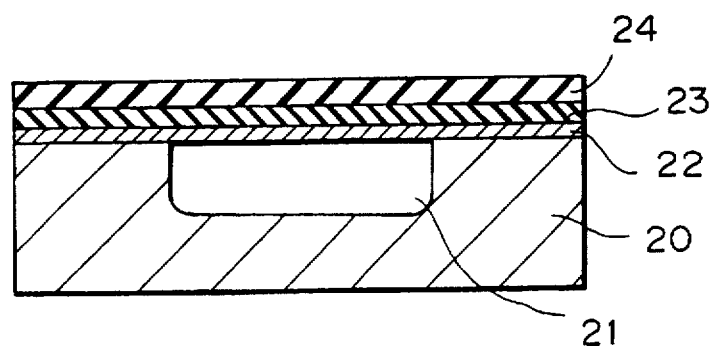
FIGS. 7A and 7B are cross sections showing a conventional thin-film temperature sensor.
Figure 7B:
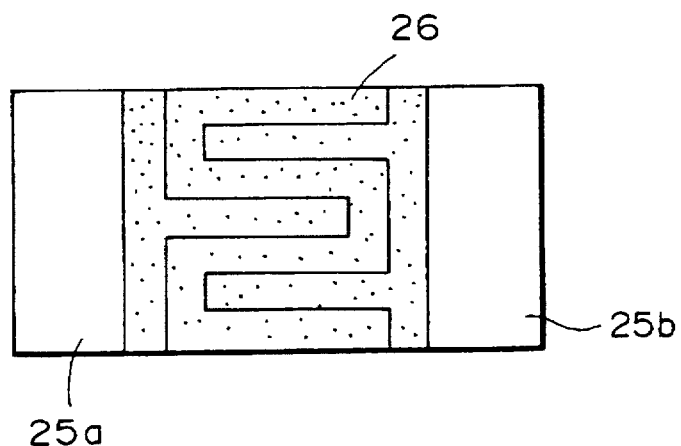

FIG. 6 shows a cross section of an infrared sensor or a thin-film thermistor using a ceramic substrate. In FIG. 6, components identical with those of the preceding embodiment shown in FIG. 1 to 4 are given like reference numbers and their explanations are omitted.

As shown in the figure, when the thin-film temperature sensor is used as the thin-film thermistor device, the cavity formed in the back of the substrate is not required as it is with the infrared sensor made from the thin-film temperature sensor of the above embodiment. Possible materials for the substrate 1 include ceramic insulating materials such as alumina, quartz, mullite and steatite. The substrate formed of such insulating materials obviates the need for the thermal oxide films 2a, 2b, but other processing steps of manufacture are identical with those of the thin-film temperature sensor (thermal type infrared sensor) of the embodiment.

Because the substrate etch is not performed, this embodiment does not require the insulating film 12.

As described above, because this invention employs the construction in which the thermal sensitive resistor film is sandwiched between the insulating films, it is possible to prevent the oxide components making up the thermal sensitive resistor film from diffusing into the substrate and the composition of the protective insulating film from diffusing into the thermal sensitive resistor film, thus eliminating the variations in the electric characteristics of the thermal sensitive resistor film.

Further, because the buffer film is formed directly over the thermal sensitive resistor film, the composition of the glass layer can be prevented from being diffused into the thermal sensitive resistor film by thermal stresses produced by the heat treatment when forming the glass layer, thus eliminating variations in the electric characteristic of the thermal sensitive resistor film.

Furthermore, because the infrared sensitive element has a bridge structure in which the protective insulating film and the glass layer are extended over the substrate, the strength of the bridge portion can be increased, which in turn reduces such failures as break or crack during the manufacturing process and improves mass-productivity and yield.

Because the thin-film temperature sensor has the glass layer of borosilicate glass-based oxide thin film, its infrared absorption characteristic is improved. Reflowing the glass layer improves its quality, further enhancing the infrared absorption characteristic.

Micromachining technique used in making the thin-film temperature sensor reduces variations in electrical characteristics of the sensor, which is therefore suited for mass production.

In the case of the silicon substrate, forming the insulating film of aluminum oxide or tantalum oxide provides a thin-film temperature sensor with strong resistance to thermal stresses.

Furthermore, because the infrared sensitive element of the thin-film temperature sensor using the silicon substrate is structured in a bridge shape, it has a large heat resistance and a small heat capacity, which in turn enhances the thermal response.

What is claimed is:

1. A thin-film temperature sensor comprising:

a substrate having a major surface;

a pair of electrode layers formed on the major surface of the substrate;

an insulating film formed between a portion of the pair of electrode layers and the substrate;

at least one layer of thermal sensitive resistor film in contact with the pair of electrode layers;

a protective insulating film formed over and in direct contact with the at least one layer of thermal sensitive resistor film and the pair of electrode layers;

a buffer film;

a glass layer covering the buffer film and undergoing heat treatment during production of the temperature sensor;

wherein said buffer film consists essentially of a metal oxide which protects the thermal sensitive resistor film from undergoing changes in electrical characteristics due to diffusion during said heat treatment of the glass layer during the production of the temperature sensor and wherein said thermal sensitive resistor film is more stable after the production with said buffer film present during the production than without the buffer film.

2. A thin-film temperature sensor according to claim 1 wherein the first insulating film formed over the substrate is a thin film of aluminum oxide or tantalum oxide.

3. A thin-film temperature sensor according to claim 1, wherein the thermal sensitive resistor film is a thermistor and is a thin film made of a transition metal oxide.

4. A thin-film temperature sensor according to claim 1, wherein the buffer film comprises one of tantalum oxide and titanium oxide.

5. A thin-film temperature sensor according to claim 1, wherein the glass layer is made of a borosilicate glass-based oxide.

6. A thin film temperature sensor according to claim 1, wherein the heat treatment includes reflowing of the glass layer.

7. A thin-film temperature sensor comprising:

a substrate formed with a cavity;

a first insulating film formed over the substrate in the form of a bridge;

a pair of metal base layers formed opposite each other over the first insulating film;

a second insulating film formed over the first insulating film between the pair of metal base layers;

a pair of electrode layers deposited over the metal base layers and extending over the second insulating film;

at least one thermal sensitive resistor film formed over and in contact with the pair of electrode layers;

a protective insulating film provided over the thermal sensitive resistor film;

a buffer film formed over the protective insulating film, a glass layer extending over the substrate, covering the buffer film, and undergoing heat treatment during production of the temperature sensor;

wherein said buffer film consists essentially of a metal oxide which protects the thermal sensitive resistor film from undergoing changes in electrical characteristics due to diffusion during said heat treatment of the glass layer during the production of the temperature sensor and wherein said thermal sensitive resistor film is more stable after the production with said buffer film present during the production than without the buffer film.

8. A thin-film temperature sensor according to claim 7, wherein the buffer film comprises one of tantalum oxide and titanium oxide.

9. A thin film temperature sensor according to claim 2, wherein the heat treatment includes reflowing of the glass layer.

10. A thin-film temperature sensor comprising:

a substrate made of ceramics;

a first insulating film formed over the substrate;

a pair of metal base layers formed opposite each other over the first insulating film;

a second insulating film formed over the first insulating film between the pair of metal base layers;

a pair of electrode layers deposited over the metal base layers and extending over the second insulating film;

at least one thermal sensitive resistor film formed over and in contact with the pair of electrode layers;

a protective insulating film provided over the thermal sensitive resistor film;

a buffer film formed over the protective insulating film.

a glass layer extending over the substrate, covering the buffer film, and undergoing heat treatment during production of the temperature sensor;

wherein said buffer film consists essentially of a metal oxide which protects the thermal sensitive resistor film from undergoing changes in electrical characteristics due to diffusion during said heat treatment of the glass layer during the production of the temperature sensor and wherein said thermal sensitive resistor film is more stable after the production with said buffer film present during the production than without the buffer film.

11. A thin-film temperature sensor according to claim 10, wherein the buffer film comprises one of tantalum oxide and titanium oxide.

12. A thin film temperature sensor according to claim 3, wherein the heat treatment includes reflowing of the glass layer.

* * * * *